United States Patent Office 2,864,740
Patented Dec. 16, 1958

2,864,740

BETA-ALKYLMERCAPTOVINYL DIALKYL PHOSPHATE AND THIOPHOSPHATE INSECTICIDES

William R. Diveley, Newark, Del., assignor to Hercules Powder Company, Wilmington, Del., a corporation of Delaware No Drawing. Application December 30, 1957
Serial No. 705,798

15 Claims. (Cl. 167—22)

This invention relates to new and useful organic phosphorus compounds and to pesticidal compositions containing the same.

The novel organic phosphorus compounds of this invention have the general formula:

$$RSCH=\overset{R''}{\underset{|}{C}}-Y-\overset{X}{\underset{\|}{P}}(OR')_2$$

in which R and R' represent lower alkyl radicals, R'' represents a lower alkyl radical or hydrogen, and X and Y are members of the group of oxygen and sulfur.

These organic phosphorus compounds have pesticidal properties and distinguish themselves in being highly toxic to insects and mites at low concentrations and in having plant systemic activity.

The process of this invention is expressed by the equations of the following methods:

METHOD I

$$R-S-S-R + Cl_2 \longrightarrow 2RSCl$$

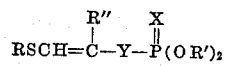

$$RSCl + CH_2=\overset{X}{\underset{|}{\underset{R''}{C}}}-Y\overset{\|}{P}(OR')_2 \longrightarrow RSCH_2-\overset{X}{\underset{|}{\underset{R''}{CClY}}}\overset{\|}{P}(OR')_2$$

$$RSCH_2-\overset{X}{\underset{|}{\underset{R''}{CClY}}}\overset{\|}{P}(OR')_2 \longrightarrow RSCH=\overset{X}{\underset{|}{\underset{R''}{C}}}-Y\overset{\|}{P}(OR')_2 + HCl$$

METHOD II

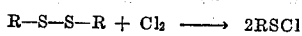

$$[(R'O)_2\overset{X}{\underset{\|}{P}}-]_2S + Cl_2 \longrightarrow (R'O)_2\overset{X}{\underset{\|}{P}}-SCl + (R'O)_2\overset{X}{\underset{\|}{P}}-Cl$$

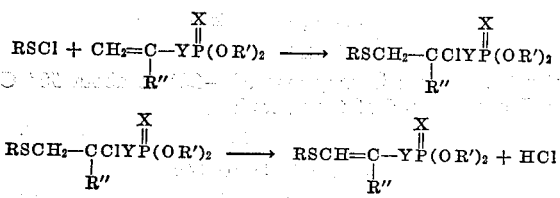

$$RSCH=\overset{}{\underset{|}{\underset{R''}{CH}}} + (R'O)_2\overset{X}{\underset{\|}{P}}-SCl \longrightarrow RSCH-\overset{X}{\underset{|}{\underset{Cl\ \ R''}{C}}}-S\overset{\|}{P}(OR')_2$$

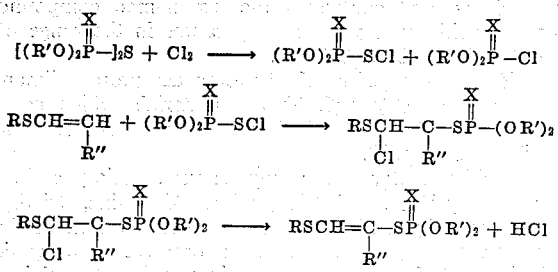

$$RSCH-\overset{X}{\underset{|}{\underset{Cl\ \ R''}{C}}}-S\overset{\|}{P}(OR')_2 \longrightarrow RSCH=\overset{X}{\underset{|}{\underset{R''}{C}}}-S\overset{\|}{P}(OR')_2 + HCl$$

in which formulas R, R' are lower alkyl groups, R'' is lower alkyl or hydrogen and X and Y are members of the group of sulfur and oxygen.

These methods of preparation are more particularly described by the following examples which also show and describe the manner in which the products are used as pesticides. All parts and percentages are by weight.

*Example 1*

Ethanesulfenyl chloride, $C_2H_5SCl$, was prepared by introducing 88.75 parts chlorine gas over a 3.5 hour period at −20 to −25° C. into 152.5 parts diethyl disulfide in 870 parts dry toluene.

To the ethanesulfenyl chloride solution was added with cooling to keep the temperature below −10° C. 485 parts diethyl isopropenyl phosphate (J. F. Allen and O. H. Johnson, J. Am. Chem. Soc. 77, 2871 (1955)) dropwise with stirring. This solution was permitted to warm to about 25° C. whereupon the originally orange colored solution became pale amber. The product had the formula:

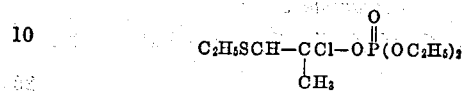

$$C_2H_5SCH-\overset{}{\underset{|}{\underset{CH_3}{CCl}}}-O\overset{O}{\underset{\|}{P}}(OC_2H_5)_2$$

In order to split out hydrogen chloride, 197.5 parts pyridine was added over a 10-minute period while heating at 100° C. The heating was continued 1.25 hours at 100° C. during which time pyridine hydrochloride separated. This reaction mixture was then cooled to 20° C.; the salt was removed by filtration and the filtrate was poured into a mixture of equal parts of 10% sodium carbonate solution and 15% brine solution, with stirring. The organic layer which was separated was washed neutral with 15% brine and dried over sodium sulfate. The toluene solvent was removed under reduced pressure and the residue was distilled in vacuo. The product amounting to 282 parts was distilled at 122–137° C./0.9–2.2 mm. Hg. It was a light tan liquid which on redistillation boiled at 102–108° C./0.3–0.6 mm. Hg. It analyzed as follows: $n_D^{20}$ 1.4648; S, 12.6%; P, 12.3%. Hydrolysis of this product in the presence of 2,4-dinitrophenylhydrazine hydrochloride in aqueous hydrochloric acid containing mercuric chloride as a catalyst resulted in the formation of the 2,4-dinitrophenylosazone of 1-ethylthioacetone indicating thereby that the ethylthio group was on the carbon adjacent the carbon to which the methyl group was attached.

*Example 2*

The general procedure of Example 1 was followed but using 117.5 parts dimethyl disulfide instead of 152.5 parts diethyl disulfide. The product of formula

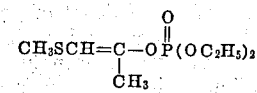

$$CH_3SCH=\overset{}{\underset{|}{\underset{CH_3}{C}}}-O\overset{O}{\underset{\|}{P}}(OC_2H_5)_2$$

amounting to 302 parts was distilled at 115–131° C./1.0–2.0 mm. Hg and analyzed as follows: $n_D^{20}$ 1.4656; S, 13.2%; P, 12.8%.

*Example 3* n-Propanesulfenyl chloride was prepared by passing 7.1 parts chlorine gas into a solution of 15 parts bis(n-propyl) disulfide in 200 parts carbon tetrachloride at −20° to −25° C. After holding this solution at about −20° C. for an hour, 38.8 parts diethyl isopropenyl phosphate was slowly added over a 20-minute period. An orange solution which became pale amber on warming to room temperature resulted. The carbon tetrachloride solvent was removed under reduced pressure and 90 parts toluene and 16 parts pyridine were added. The resulting mixture was stirred and heated at 100° C. for 1 hour. The product was isolated as in Example 1. The product of formula

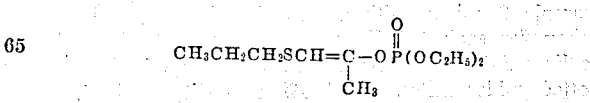

$$CH_3CH_2CH_2SCH=\overset{}{\underset{|}{\underset{CH_3}{C}}}-O\overset{O}{\underset{\|}{P}}(OC_2H_5)_2$$

amounted to 21 parts. Its properties were: boiling point 100–107° C./0.3–0.5 mm. Hg.; $n_D^{20}$ 1.4657; S, 11.5%; P, 11.5%.

Example 4

2-Methylthio-1-methylvinyl dimethyl phosphate of the formula

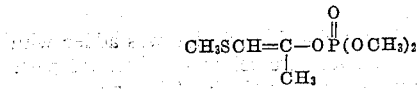

prepared according to Example 1, but using dimethyl isopropenyl phosphate and dimethyl disulfide as reagents, had the following analysis: $n_D^{20} = 1.4726$; P, 14.5%; boiling point 104–107° C./0.8 to 1.1 mm. Hg.

Example 5

2-ethylthio-1-methylvinyl dimethyl phosphate of the formula

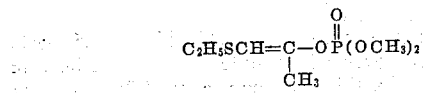

prepared according to Example 1, but using dimethyl isopropenyl phosphate and diethyl disulfide as reagents, had the following analysis: $n_D^{20} = 1.4737$; S, 14.7%; P, 12.8%; boiling point 106–120° C./0.7 to 0.9 mm. Hg.

Example 6

Diethoxyphosphinyl sulfenyl chloride was prepared by passing 12.3 parts chlorine gas into a mixture of 53.2 parts bis(diethoxyphosphinyl)sulfide in 160 parts carbon tetrachloride cooled to −20 to −25° C. After an hour, 13.3 parts methyl vinyl sulfide was added dropwise while cooling over a 20-minute period. The reaction mixture changed color from orange to amber. To this reaction mixture was then added 28.4 parts pyridine dropwise with cooling. On completion of the addition of the pyridine, the mixture was heated at 60–80° C. for an hour to complete the reaction. The resulting reaction mixture was then cooled and poured into a mixture of 10% aqueous sodium carbonate and a 15% brine solution. The organic layer was separated and combined with two ether extracts of the aqueous layer. The solvent was then removed from the organic layer under reduced pressure and the residue amounting to 10.5 parts was taken as product. Its analysis was: S, 26.7%.

An emulsified concentrate of each product was made by mixing 1 gram of the toxicant of each of Examples 1–6 with 1 ml. benzene and 1 ml. sorbitan monolaurate polyoxyalkylene derivative (Tween 20). This concentrate was then diluted with water to form dispersions of the residue in water varying in concentration from 1.0% to 0.0005%. The dispersions were then tested for their toxicity to caged insects and to mites not only by spraying the insects but by spraying the plants alone as well for the purpose of determining residual toxicity. Standard test methods were used for obtaining toxicity and systemic activity.

Tests were also made on pea seeds by soaking them in a 0.025% emulsion of the product of Example 1 for 18–24 hours and then planting them. When the plants which emerged were infested with pea aphids there was a 100% kill and no nymphs appeared.

In other tests, a 20 ml. portion of a 0.1% emulsion of the compound of Example 1 was poured onto soil in which cotton plants were growing. One month later when these plants were infested with two-spotted spider mites there resulted a 100% kill of the mites.

Cotton seed treated with 3 lb. of the compound of Example 2 mixed with an equal weight of activated carbon for each 100 lb. of seed was planted and the seedlings 5 days after emergence were infested with two-spotted spider mites. A 100% mortality resulted.

The table below gives additional toxicity data on the compounds of this invention.

| Insect | Concentration | Example | | | | | |
|---|---|---|---|---|---|---|---|
| | | 1 | 2 | 3 | 4 | 5 | 6 |
| | | Percent Kill | | | | | |
| Mexican Bean Beetle | 0.025% | 100 | 100 | 100 | 60 | 100 | 100 |
| Pea Aphid (Contact) | 0.005% | 100 | 100 | 95 | 90 | 100 | ---- |
| Pea Aphid (Cut Stem Systemic) | 5 p. p. m. | ---- | ---- | 100 | 100 | ---- | 20 |
| | 2 p. p. m. | 100 | 100 | ---- | ---- | 100 | ---- |
| Two-Spotted Mite (Contact) | 10 p. p. m. | ---- | ---- | ---- | 92 | 92 | ---- |
| | 5 p. p. m. | 95 | 100 | 95 | ---- | ---- | 71 |
| Two-Spotted Mite (Cut Stem Systemic) | 5 p. p. m. | ---- | ---- | ---- | 100 | ---- | 100 |
| | 2 p. p. m. | 100 | 100 | ---- | ---- | 100 | ---- |

The cut stem systemic activity test is carried out by placing cut stems of 7–10 day old lima bean plants in water containing the compound of the examples in the concentrations indicated and 24 hours later, infesting with 50–100 two-spotted spider mites. Mite mortality count is made after 6 days. When tests are made against aphids 5–6 day seedlings are used as the source of the cut stems, 10 adult aphids are placed on the cut stems and the mortality count is made after 2 days.

In the contact test, the compound of the examples at the indicated concentration is sprayed as a mist on potted pea plants, infested with 10 adult pea aphids and enclosed in a small cage, and the mortality count is made after 48 hours. When the test is made with two-spotted mites, lima bean seedlings infested with 150 mites are used and a mortality count is made after 5 days.

The most effective compounds of this invention as insecticides are those in which R and R′ are methyl and/or ethyl and R″ is hydrogen or methyl. However, the lower alkyl groups may contain 1 to 4 carbon atoms, and the term "lower alkyl" is so defined.

Method I for the preparation of the compounds of this invention is carried out by contacting a compound of the formula RSCl with a compound of the formula

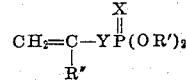

at a temperature in the range of −20° to about 50° C. until a compound of the formula

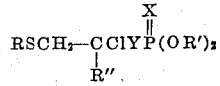

is produced and contacting the last named compound with an acid acceptor at a temperature in the range of about 20° to about 150° C.

Acid acceptors (also called proton acceptors, Gilman, Organic Chemistry, vol. 3) are materials which combine with the halogen acid liberated and thus allow the equilibrium to shift.

As acid acceptors there may be used tertiary amines such as pyridine, quinoline, trimethyl amine, triethyl amine, dimethyl aniline and other amines known in the art for use in dehydrohalogenation processes. Inorganic alkaline materials such as magnesium carbonate, calcium carbonate, sodium acetate and similar neutralizing materials known for dehydrohalogenation of halogen-containing esters may be used. The preferred acid acceptors are neutral compounds and are not saponification agents and are accordingly mild in their action in accepting halogen acid without saponifying the ester groups of the product. Alkaline materials such as sodium hydroxide, sodium ethoxide, calcium hydroxide and other well known dehydrohalogenation materials and acid acceptors may be used if added gradually and cautiously so as to avoid a high concentration at any time as the splitting out of hydrogen chloride proceeds.

The methods by which the products of this invention are isolated will vary slightly with the reactants used and the product produced. Further purification by selective solvent extraction or by adsorptive agents such as activated carbon, or clays can precede the removal of the solvent. Likewise, an organic solvent can be added to aid in the purification by adsorptive agents. However, the product is generally satisfactory for use as a pesticide without further purification.

The compounds of this invention are used as the sole toxic agent in pesticidal formulations or in admixture with other toxicants for modification of the properties of the individual toxicants. They may be used, for example, in admixture with toxaphene, DDT, Thanite, Chlordane, rotenone, pyrethrum, and the like in many of the formulations suggested below.

The compounds of this invention are made into pesticidal compositions for use against insects and mites by dilution with an insecticide adjuvant as a carrier therefor, by dispersing in organic solvent, or in water, or by diluting with a solid insecticide adjuvant as a carrier. Dispersions containing a surface-active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in aerosol formulations in which difluorodichloromethane and similar aerosol propellants form the propellant vehicle.

Aqueous dispersions are made up from the compounds of this invention, a surface-active dispersing agent and water as the essential ingredients. The amount of the compounds of this invention in the aqueous dispersions when diluted for spraying of plants will be in the range of about 10% to about 0.001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface-active dispersing agent. The concentrate may also contain sufficient amounts of organic solvents to aid in effective dispersion. The amount of surface-active dispersing agent used is usually at least 5% of the amount of toxic compound in the concentrate.

Suitable surface-active dispersing agents for use in the compositions of this invention are those disclosed in "Chemistry of Insecticides, Fungicides, and Herbicides" (Donald E. H. Frear, second edition (1948), pages 280–287) for use with known insecticides and include neutral soaps of resin, alginic and fatty acids and alkali metals or alkyl amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the toxic material and surface-active dispersing agent will in some instances have more that one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

What I claim and desire to protect by Letters Patent is:

1. A compound of the formula:

$$RSCH=C-Y-P(OR')_2$$
$$\phantom{RSCH=C-Y-}\underset{R''}{|}\ \underset{X}{\|}$$

in which R and R' are lower alkyl radicals, R'' is selected from the group consisting of lower alkyl radicals and hydrogen and X and Y are members of the group consisting of sulfur and oxygen.

2. A new compound of the formula:

$$C_2H_5S.CH=C-O-P(OC_2H_5)_2$$
$$\phantom{C_2H_5S.CH=}\underset{CH_3}{|}\ \underset{O}{\|}$$

3. A new compound of the formula:

$$CH_3S.CH=C-O-P(OC_2H_5)_2$$
$$\phantom{CH_3S.CH=}\underset{CH_3}{|}\ \underset{O}{\|}$$

4. A new compound of the formula:

$$C_3H_7S.CH=C-O-P(OC_2H_5)_2$$
$$\phantom{C_3H_7S.CH=}\underset{CH_3}{|}\ \underset{O}{\|}$$

5. A new compound of the formula:

$$CH_3SCH=C-O-P(OCH_3)_2$$
$$\phantom{CH_3SCH=}\underset{CH_3}{|}\ \underset{O}{\|}$$

6. A new compound of the formula:

$$CH_3SCH=CH-SP(OC_2H_5)_2$$
$$\phantom{CH_3SCH=CH-S}\underset{O}{\|}$$

7. An insecticide composition comprising a compound of claim 1 and an insecticide adjuvant as a carrier therefor.

8. An insecticide composition comprising a compound of claim 2 and an insecticide adjuvant as a carrier therefor.

9. An insecticide composition comprising a compound of claim 3 and an insecticide adjuvant as a carrier therefor.

10. An insecticide composition comprising a compound of claim 4 and an insecticide adjuvant as a carrier therefor.

11. An insecticide composition comprising a compound of claim 5 and an insecticide adjuvant as a carrier therefor.

12. An insecticide composition comprising a compound of claim 6 and an insecticide adjuvant as a carrier therefor.

13. The method of preparing a compound of the formula:

$$RSCH=C-YP(OR')_2$$
$$\phantom{RSCH=}\underset{R''}{|}\ \overset{X}{\|}$$

which comprises contacting a compound of the formula RSCl with a compound of the formula $$CH_2=C-YP(OR')_2$$
$$\phantom{CH_2=}\underset{R''}{|}\ \overset{X}{\|}$$

at a temperature in the range of about −20 to about 50° C. whereby a compound of the formula $$RSCH_2-CClYP(OR')_2$$
$$\phantom{RSCH_2-CCl}\underset{R''}{|}\ \overset{X}{\|}$$

is produced and subsequently heating said last named compound at a temperature in the range of about 20° C. to about 150° C. in the presence of an acid acceptor, in the formulas R and R' representing lower alkyl radicals, R" representing a member of the group consisting of lower alkyl radicals and hydrogen, and X and Y representing members of the group consisting of sulfur and oxygen.

14. The method of preparing a compound of the formula:

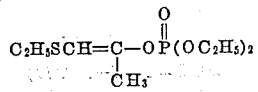

which comprises contacting a compound of the formula $C_2H_5SCl$ with a compound of the formula

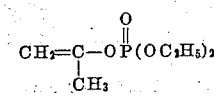

at a temperature in the range of about −20° to about 50° C. whereby a compound of the formula

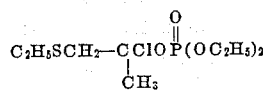

is produced and subsequently heating said last named compound at a temperature in the range of about 20° C. to about 150° C. in the presence of an acid acceptor.

15. The method of preparing a compound of the formula:

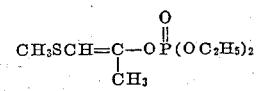

which comprises contacting a compound of the formula $CH_3SCl$ with a compound of the formula

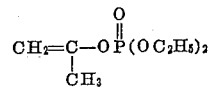

at a temperature in the range of about −20° to about 50° C. whereby a compound of the formula

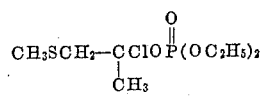

is produced and subsequently heating said last named compound at a temperature in the range of about 20° C. to about 150° C. in the presence of an acid acceptor.

No references cited.